US008515056B2

(12) United States Patent
Kang

(10) Patent No.: US 8,515,056 B2
(45) Date of Patent: Aug. 20, 2013

(54) PORTABLE TERMINAL WITH BUILT-IN ANTENNA

(75) Inventor: Kui-Ho Kang, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1148 days.

(21) Appl. No.: 12/203,016

(22) Filed: Sep. 2, 2008

(65) Prior Publication Data

US 2009/0087011 A1    Apr. 2, 2009

(30) Foreign Application Priority Data

Sep. 28, 2007    (KR) .............................. 2007-0097975

(51) Int. Cl.
*H04M 9/00* (2006.01)
(52) U.S. Cl.
USPC ........................ 379/433.12; 379/440; 379/434
(58) Field of Classification Search
USPC .................. 455/562.1; 379/440, 433.12, 434
See application file for complete search history.

(56) References Cited

U.S. PATENT DOCUMENTS

| | | | |
|---|---|---|---|
| 2005/0250532 A1* | 11/2005 | Hwang et al. | 455/550.1 |
| 2006/0097929 A1 | 5/2006 | Chung | |
| 2007/0275773 A1* | 11/2007 | Joung et al. | 455/575.1 |
| 2009/0243943 A1* | 10/2009 | Mumbru et al. | 343/702 |

FOREIGN PATENT DOCUMENTS

| | | |
|---|---|---|
| EP | 1 808 930 A1 | 7/2007 |
| WO | 2007005964 A1 | 1/2007 |

\* cited by examiner

*Primary Examiner* — Alexander Jamal
(74) *Attorney, Agent, or Firm* — Jefferson IP Law, LLP

(57) ABSTRACT

Provided is a portable terminal including a first housing, a second housing coupled to the first housing for sliding relative to the first housing while adjacent to the first housing, an antenna device disposed in the first housing, and a speaker module comprising at least one speaker unit and being one of exposed and concealed by the first housing based on the sliding position the second housing relative to the first housing, the speaker module being disposed in the second housing. The antenna device is disposed in a space between an inner face of the second housing and the speaker module, when the sliding position of second housing relative to the first housing is such that the second housing overlaps with the first housing. There is a space adjacent to the antenna device between the inner face of the second housing and the speaker module, when the speaker module is exposed by sliding the second housing. The portable terminal can mitigate interference between the antenna pattern and the speaker units while allowing the speaker module to overlap with the antenna device, thereby guaranteeing sufficient antenna performance.

20 Claims, 11 Drawing Sheets

PORTABLE TERMINAL WITH BUILT-IN ANTENNA

PRIORITY

This application claims the benefit under 35 U.S.C. §119(a) of a Korean patent application filed in the Korean Intellectual Property Office on Sep. 28, 2007 and assigned Serial No. 2007-97975, the entire disclosure of which is hereby incorporated by reference.

BACKGROUND OF THE INVENTION

1. Field of the Invention

The present invention relates to a portable terminal. More particularly, the present invention relates to a portable terminal that includes a built-in antenna for performing a mobile communication function while avoiding interference from a speaker and for facilitating miniaturization.

2. Description of the Related Art

Various forms of portable terminals having special functions, such as electronic organizers specialized for schedule management functions, Portable Multimedia Players (PMPs) specialized for game or multimedia play functions, etc., have been become popular. In general, the term "portable terminal" refers to an electronic apparatus that a user can carry to perform wireless communication with a desired partner.

Conventional portable terminals may be classified into various types according to their appearance, such as bar-type terminals, flip-type terminals, and folder-type terminals. The bar-type terminal has a single housing shaped like a bar. The flip-type terminal has a flip pivotably mounted to a bar-shaped housing by a hinge unit. The folder-type terminal has a folder coupled to a single bar-shaped housing by a hinge unit in such a manner that the folder can be rotated to fold to or unfold from the housing.

Portable terminals may also be classified into neck wearable-type terminals and wrist wearable-type terminals according to the position or manner in which a user puts on the terminal. The neck wearable-type terminal is one that a user wears around the neck using a string, and the wrist wearable-type terminal is one that a user wears around the wrist.

Additionally, portable terminals may be classified into rotation-type terminals and sliding-type terminals according to the manner of opening and closing the terminal. In the rotation-type terminal, two housings are coupled to each other in such a manner that one housing rotates to open or close relative to the other, while facing each other. In the sliding-type terminal, two housings are coupled to each other in such a manner that one housing slides in the longitudinal direction to open or close relative to the other while facing each other. These variously classified conventional portable terminals are readily understood by those of ordinary skill in the art.

With the popularization of portable terminals, commercial services using the portable terminals, e.g., multimedia functions such as games, moving picture reproduction, music file reproduction, etc., have been become popular, thereby allowing users to use the portable terminals for various applications and providing service providers with new opportunities to profit.

Such reinforcement of the multimedia functions of portable terminals having a mobile communication function, however, leads to many difficulties in miniaturization of the portable terminals, which hinders portability of the portable terminals. More specifically, larger display devices are required to provide screens having sufficient sizes, impeding miniaturization of the portable terminals. In an attempt to solve such a problem, the thickness of the portable terminal has been reduced.

Enrichment of sound and improvement of sound quality are essential to the portable terminals having advanced multimedia functions, which can be achieved by increasing the size of a speaker unit for outputting sound. Such size increase, however, may be a significant obstacle to miniaturization of the portable terminal. Moreover, as an antenna device of the portable terminal is mounted inside a housing of the portable terminal, it becomes more difficult to secure space used for arranging the speaker unit and the antenna device. In other words, electromagnetism generated by a voice coil of the speaker unit affects a radiation characteristic of the antenna device, resulting in difficulties in optimizing the performance of the antenna device while securing the space used for arranging the antenna device without being subject to interference from the speaker unit.

SUMMARY OF THE INVENTION

An aspect of the present invention is to address at least the above problems and/or disadvantages and to provide at least the advantages described below. Accordingly, an aspect of the present invention is to provide a portable terminal that allows an antenna device to be mounted inside a housing of the portable terminal while reducing influence of electromagnetism from a speaker unit.

Another aspect of the present invention is to provide a portable terminal that is not subject to electromagnetic interference from a speaker unit, thereby providing a unique radiation characteristic of an antenna device.

Still another aspect of the present invention is to provide a portable terminal that enables an increased size of a speaker unit while minimizing an influence of electromagnetism from the speaker unit upon an antenna device, thereby outputting rich sound with high quality.

A further aspect of the present invention is to provide a portable terminal capable of securing space used for arranging a speaker unit and an antenna device by preventing interference between the speaker unit and the antenna device.

According to an aspect of the present invention, a portable terminal is provided. The portable terminal includes a first housing, a second housing coupled to the first housing for sliding relative to the first housing while adjacent to the first housing, an antenna device disposed in the first housing, and a speaker module comprising at least one speaker unit and being one of exposed and concealed by the first housing based on the sliding position the second housing relative to the first housing, the speaker module being disposed in the second housing, wherein the antenna device is disposed in a space between an inner face of the second housing and the speaker module, when the sliding position of the second housing relative to the first housing is such that the second housing overlaps with the first housing, and wherein there is a space adjacent to the antenna device between the inner face of the second housing and the speaker module, when the speaker module is exposed by sliding the second housing.

The antenna device may include an antenna base comprising a bend at a distance away from a back face of the first housing, a portion of the antenna base being positioned in parallel with the back face of the first housing, and an antenna pattern located on a surface of the antenna base. When the antenna device is disposed in the space between the inner face of the second housing and the speaker module, the antenna device may face the speaker module whereas the antenna pattern may not face the speaker unit.

The antenna pattern may comprise a radiation member including a cut conductive plate, and further wherein the conductive plate is attached to the antenna base, or a printed circuit pattern located on the surface of the antenna base.

The speaker module may include a speaker housing disposed in the second housing and a pair of speaker units mounted in parallel with each other in the speaker housing. The antenna device may include an antenna base comprising a bend at a distance away from a back face of the first housing, a portion of the antenna base being positioned in parallel with the back face of the first housing, and an antenna pattern formed on the surface of the antenna base.

The antenna pattern may include a feeding pattern connected to a feeding unit of the portable terminal, a ground pattern connected to a ground unit of the portable terminal, and a radiation pattern connected to the feeding pattern and the ground pattern.

In a case where the speaker module includes the pair of speaker units and the antenna pattern includes the feeding pattern, the ground pattern, and the radiation pattern, a first speaker unit of the speaker units is positioned to face a first region of the antenna base, which is surrounded by the feeding pattern and the ground pattern, and a second speaker unit of the speaker units is positioned to face a second region of the antenna base, which is surrounded by the ground pattern and the radiation pattern, when the antenna device is disposed in the space between the inner face of the second housing and the speaker module.

When the speaker module is exposed by sliding the second housing, the speaker units may be moved to a position above the radiation pattern from a position that faces the antenna base.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Figure 1:
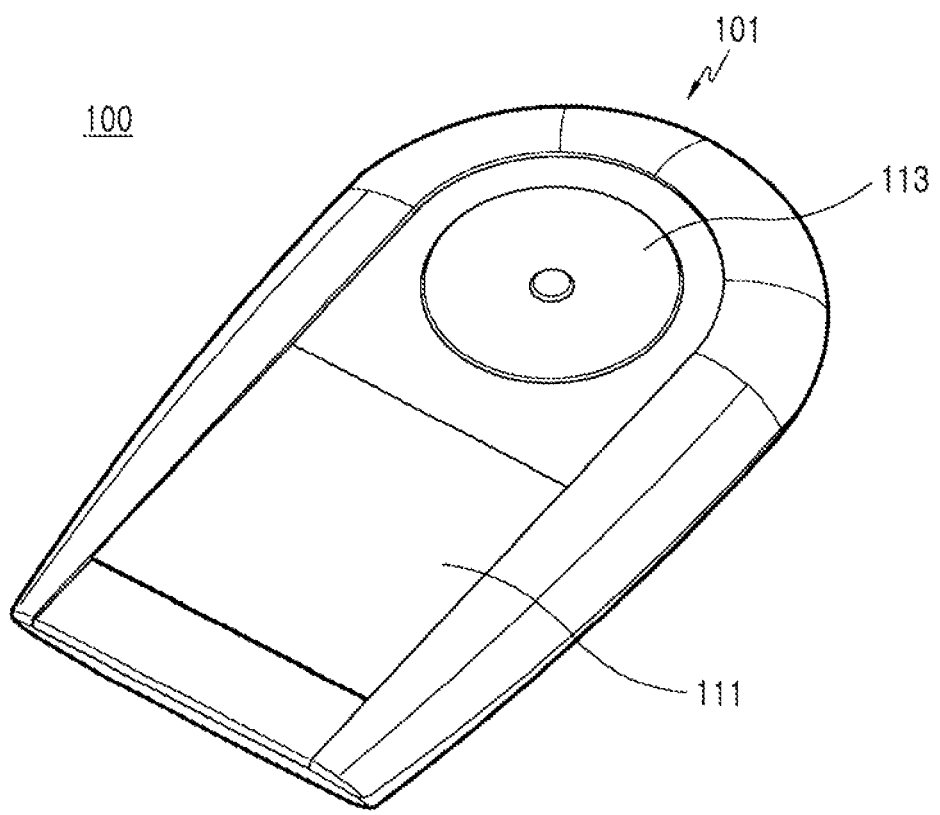
FIG. 1 is a perspective view illustrating a portable terminal according to an exemplary embodiment of the present invention.
Figure 2:
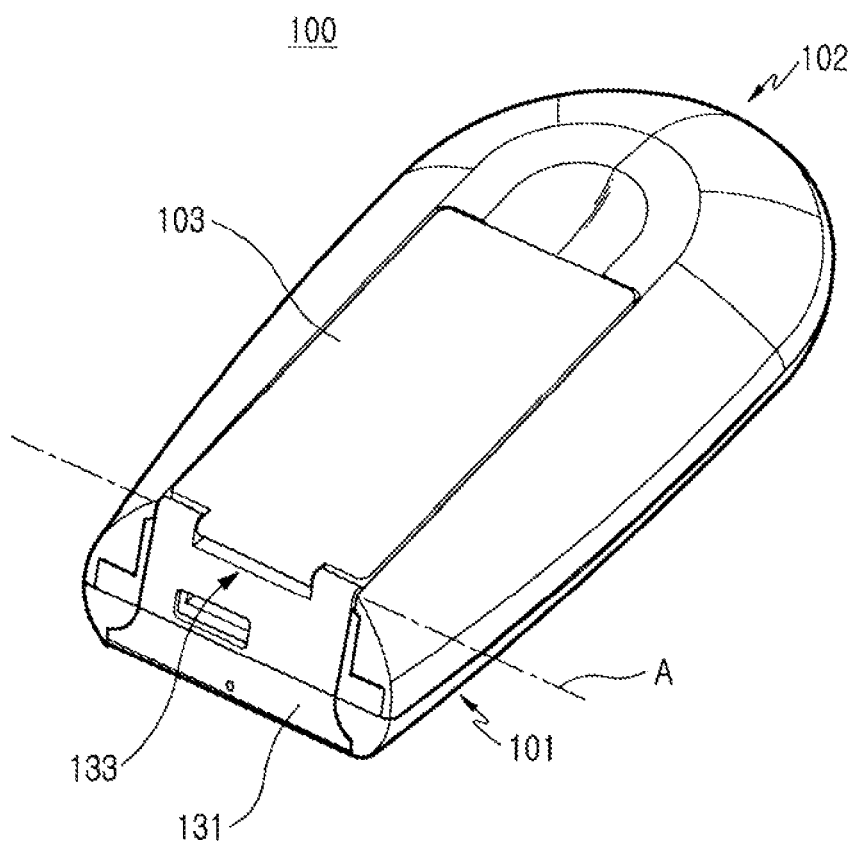
FIG. 2 is a perspective view illustrating a back face of the portable terminal illustrated in FIG. 1, according to an exemplary embodiment of the present invention.
Figure 3:
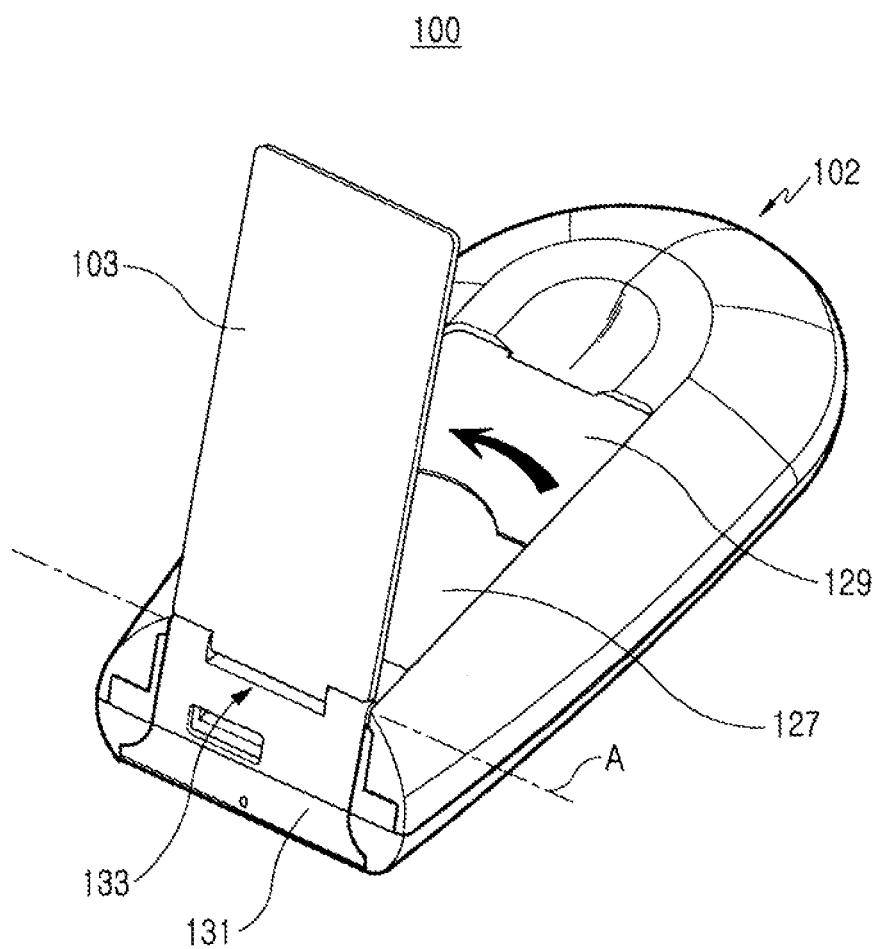
FIG. 3 is a perspective view illustrating a state where a support of the portable terminal illustrated in FIG. 2 is opened (unfolded), according to an exemplary embodiment of the present invention.
Figure 4:
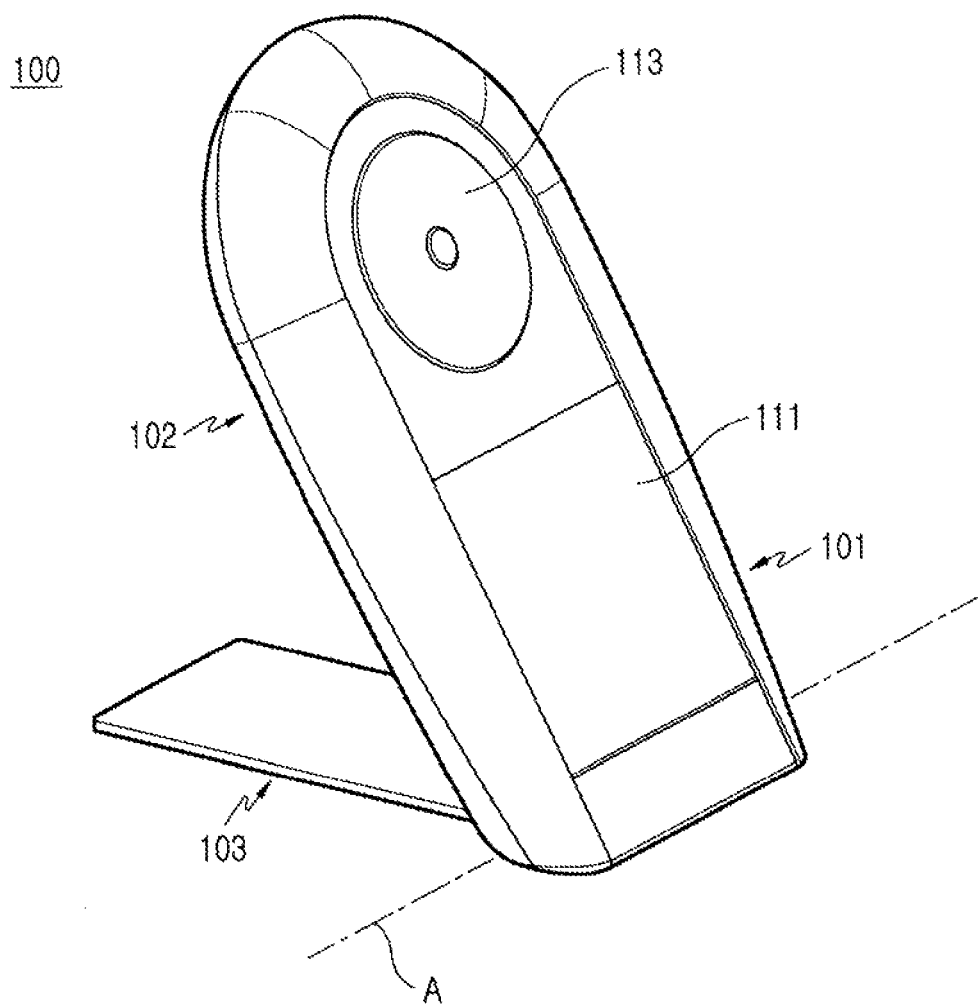
FIG. 4 is a perspective view illustrating a state where the portable terminal illustrated in FIG. 3 is supported on a horizontal plane, according to an exemplary embodiment of the present invention.
Figure 5:
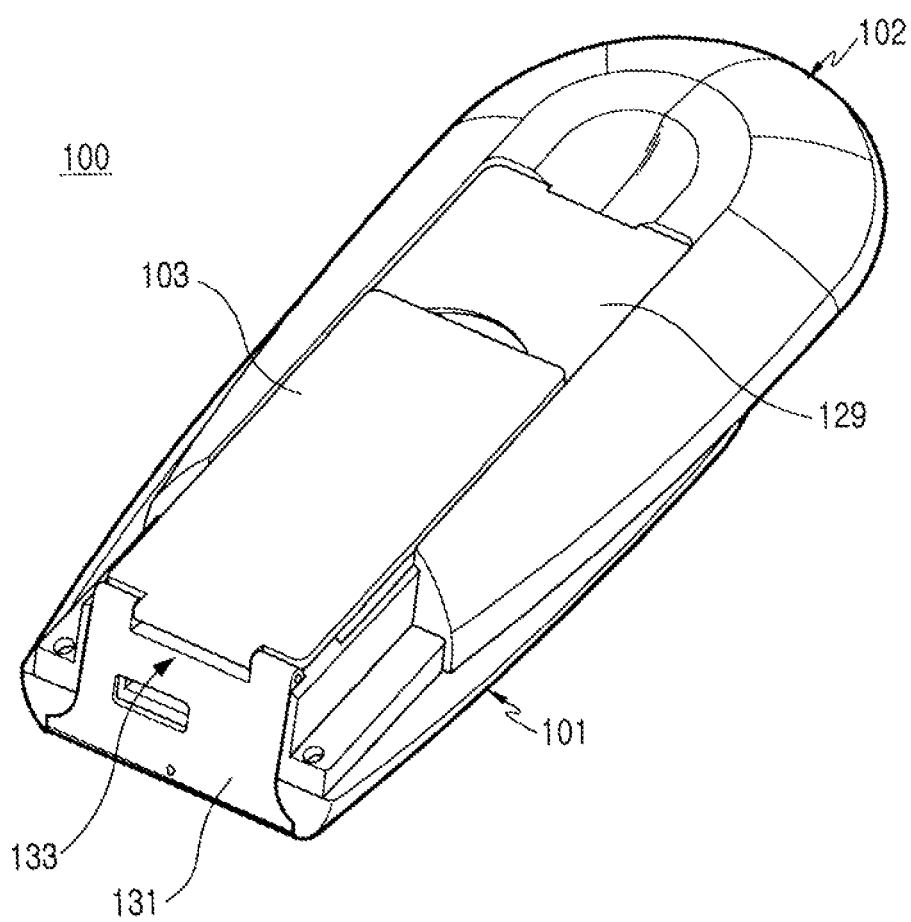
FIG. 5 is a perspective view illustrating a state where a second housing of the portable terminal illustrated in FIG. 2 slides, according to an exemplary embodiment of the present invention.
Figure 6:
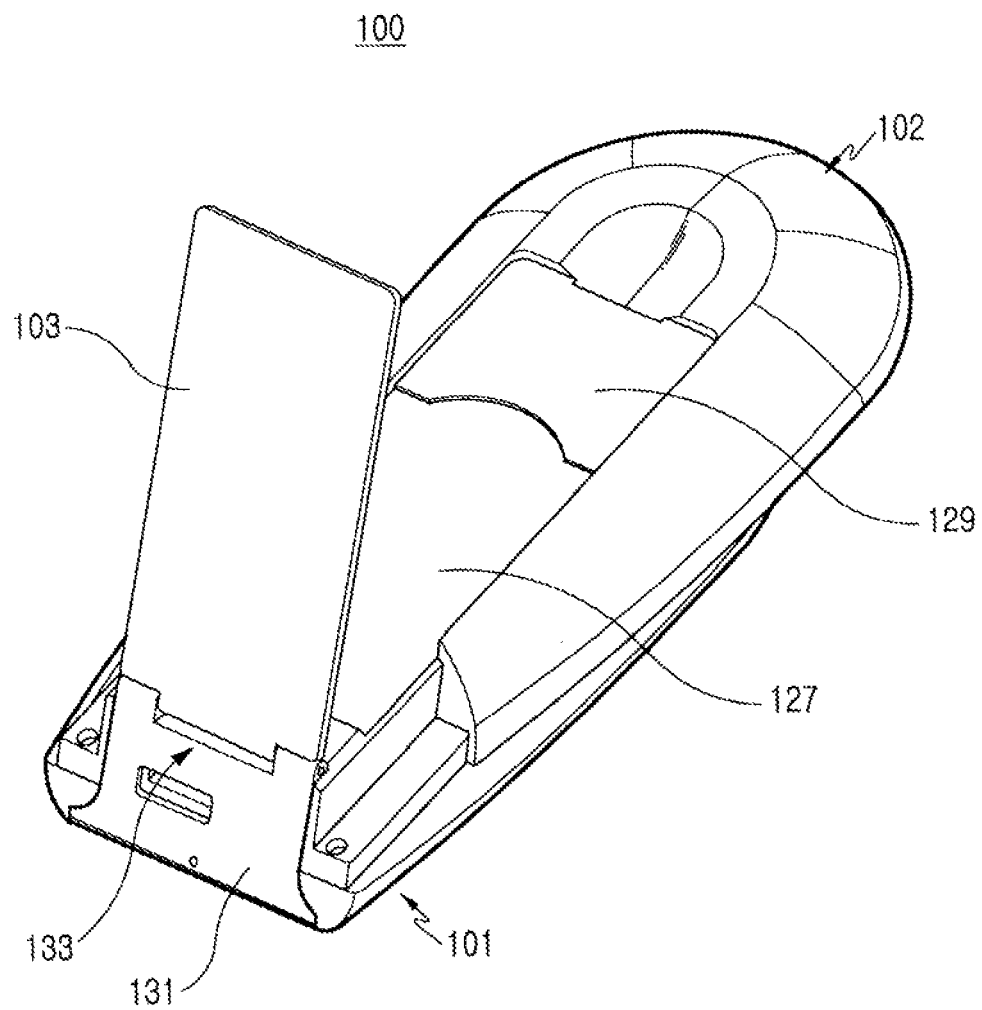
FIG. 6 is a perspective view illustrating a state where a support of the portable terminal illustrated in FIG. 5 is opened, according to an exemplary embodiment of the present invention.
Figure 7:
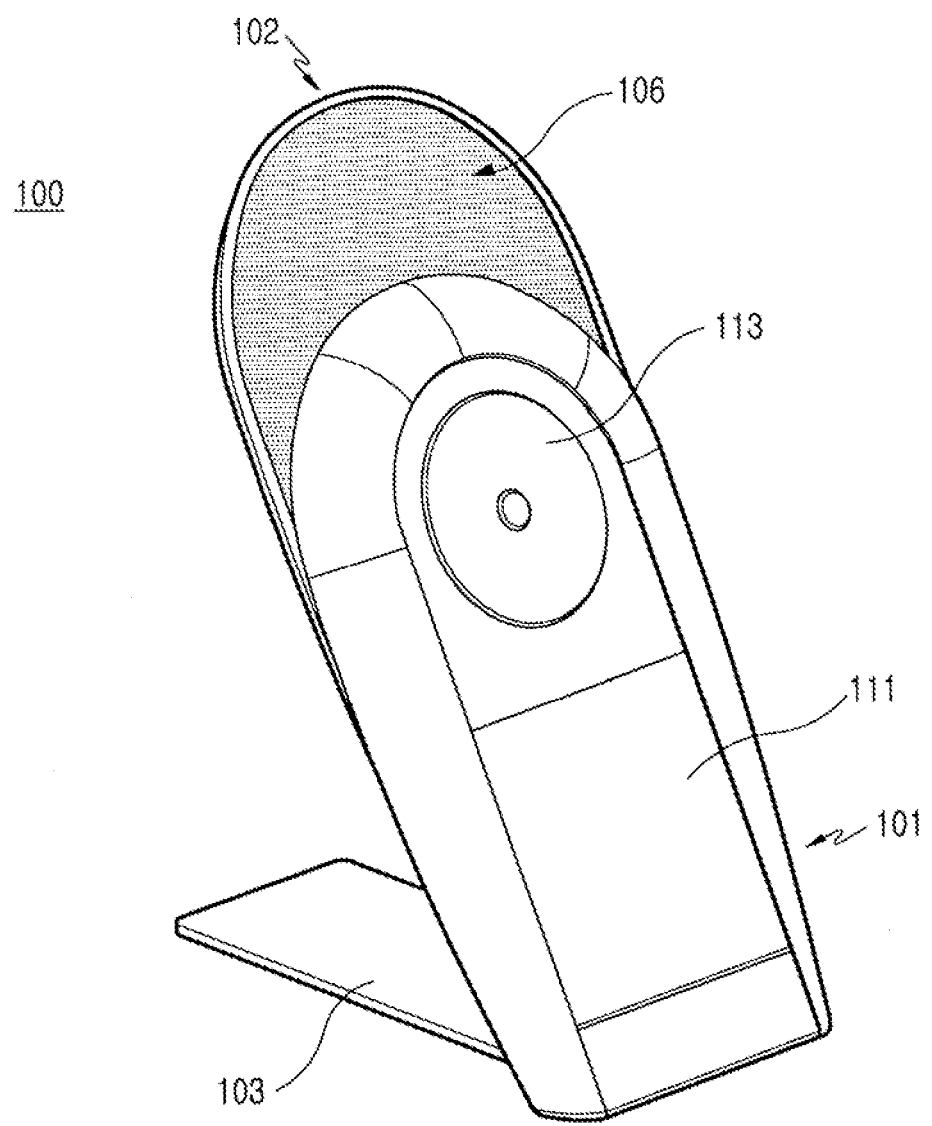
FIG. 7 is a perspective view illustrating a state where the portable terminal illustrated in FIG. 6 is supported on the horizontal plane, according to an exemplary embodiment of the present invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

A portable terminal according to an exemplary embodiment of the present invention includes a first housing, and a second housing coupled to the first housing in such a way to slide while facing the first housing. While mounted on the first housing, an antenna device of the portable terminal may also be selectively positioned in a space between an inner face of the second housing and a speaker module mounted on the second housing.

Referring to FIGS. 1 through 7, a portable terminal 100 according to an exemplary embodiment of the present invention includes a first housing 101 and a second housing 102, and can be supported on a horizontal plane by means of a support 103 pivotably mounted to the first housing 101.

The first housing 101 includes a display device 111 and a keypad 113 mounted on its front face, and includes a circuit board (not shown) having functions such as a mobile communication function, a portable multimedia player function, etc.

Figure 9:
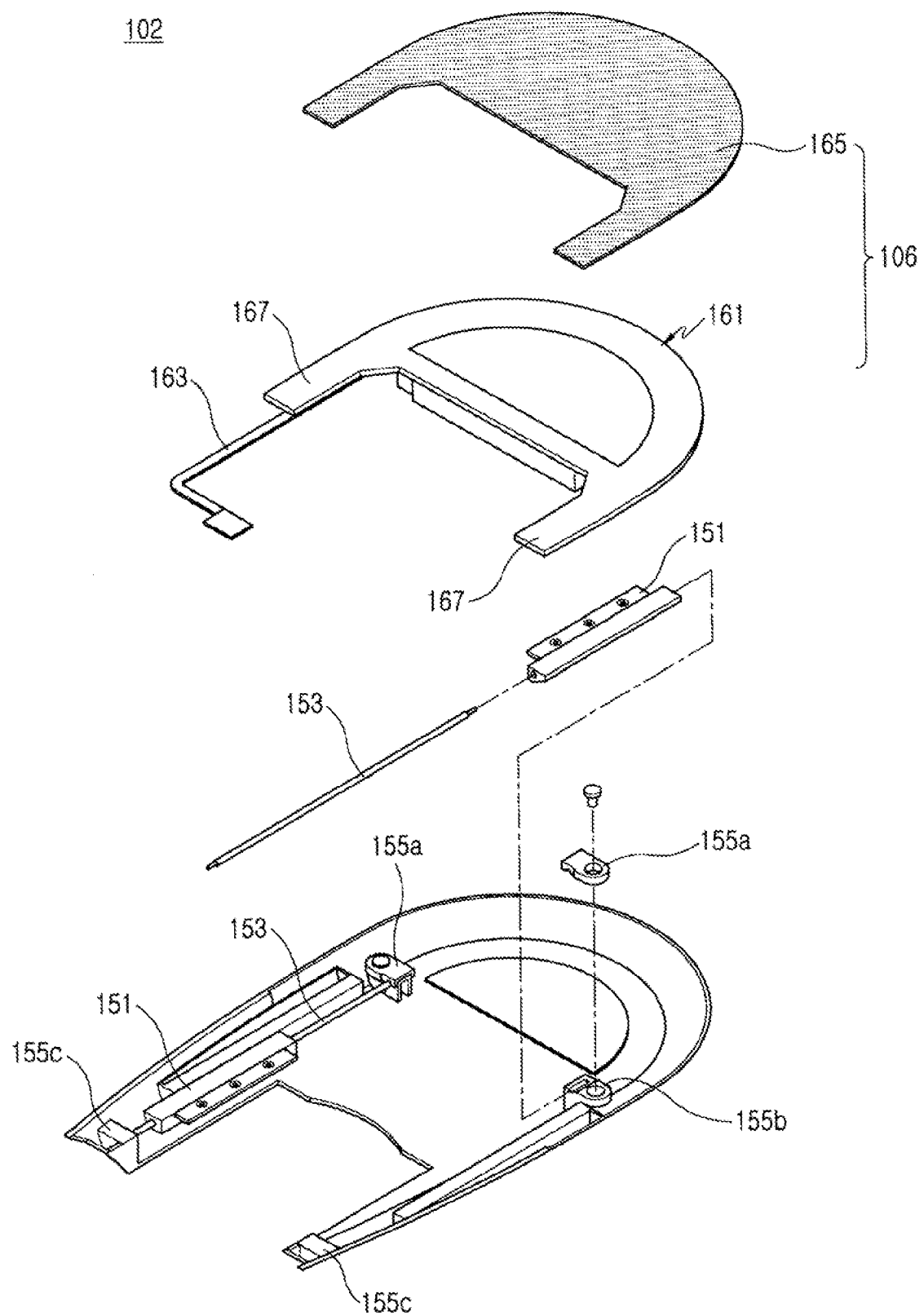
FIG. 9 is an exploded perspective view illustrating a second housing of the portable terminal illustrated in FIG. 8, according to an exemplary embodiment of the present invention.
Figure 10:
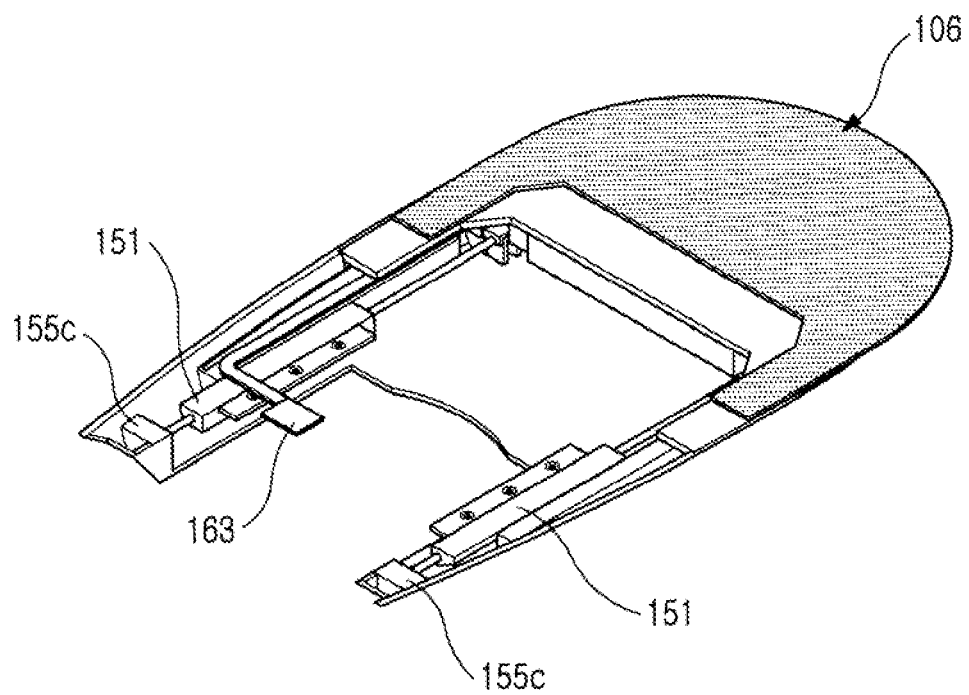
FIG. 10 is an assembled perspective view illustrating the second housing of the portable terminal illustrated in FIG. 9, according to an exemplary embodiment of the present invention.
Figure 11:
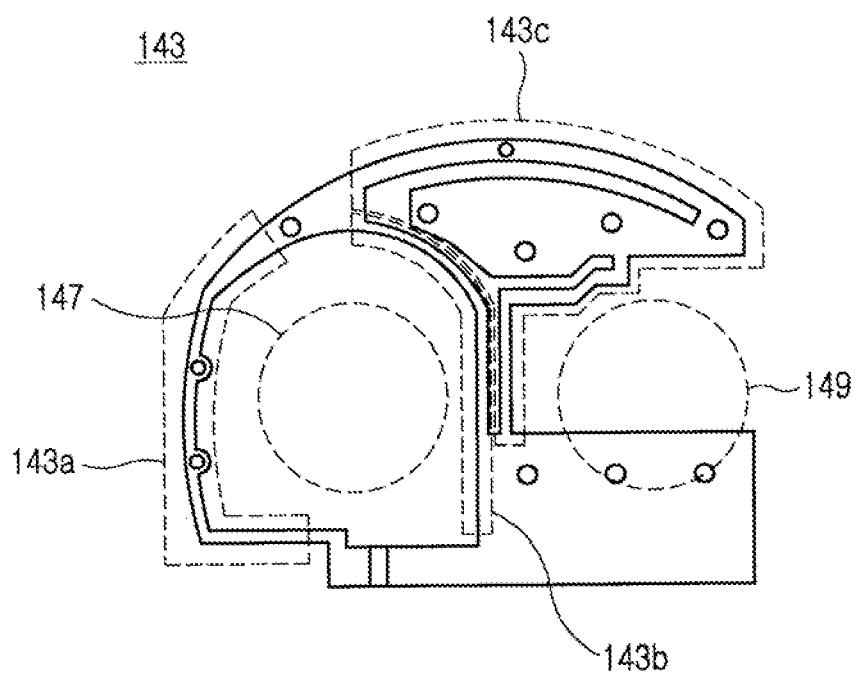
FIG. 11 is a plane view illustrating an antenna pattern of an antenna device illustrated in FIG. 8, according to an exemplary embodiment of the present invention.

The second housing 102, accommodating a speaker module (106 of FIG. 9), is slidably coupled to the first housing 101. The second housing 102 is coupled to a back face of the first housing 101 to slide relative to the first housing 101. As the second housing 102 slides, the speaker module 106 moves, together with the second housing 102, to an opened position in which the speaker module 106 is exposed or to a closed position in which the speaker module 106 is covered by the first housing 101. The coupling of the second housing 102 to the first housing 101 will be described later with reference to FIG. 9.

The support 103 is pivotably mounted to the first housing 101. To this end, a support 131 is mounted in a bottom end portion of the first housing 101 and the support 103 is pivotably coupled to a side 133 of the support 131. The support 103, coupled to the support 131, pivots about a hinge axis A, and may be positioned to cover a portion of the second housing 102 when the second housing 102 overlaps with the first housing 101. In other words, when the support 103 is closed (folded) onto the first housing 101 in the overlapping state of the second housing 102 and the first housing 101, the second housing 102 is interposed between the support 103 and the first housing 101.

A receiving recess 129 is formed in a back face of the second housing 102 in order to receive the support 103 when the second housing 101 overlaps with the first housing 101 and the support 103 is closed onto the first housing 101. Thus, when the second housing 102 overlaps with the first housing 101, the support 103 does not protrude outside the first housing 101 and the second housing 102 from its closed position. Thus, the portable terminal 100 itself includes the support 103 to allow users to conveniently carry the portable terminal 100 and to enjoy music or moving pictures on the portable terminal 100 supported on a horizontal plane. Since the speaker module 106 is exposed in an opened position by sliding the second housing 102, users can enjoy music or moving pictures with rich sound.

A battery pack 127 is mounted on the back face of the first housing 101 and a portion thereof is exposed or hidden by the second housing 102. In other words, at least one portion of the battery pack 127 is covered with the second housing 102 when the second housing 102 overlaps with the first housing 101, and the battery pack 127 is exposed when the speaker module 106 is exposed by sliding the second housing 102. However, when the support 103 is closed onto the first housing 101, the battery pack 127 maintains its closed state by means of the support 103, regardless of a sliding or non-sliding of the second housing 102.

An antenna device 104 and the speaker module 106 of the portable terminal 100 will now be described with reference to FIGS. 8 through 11.

The antenna device 104 includes an antenna base 141 mounted on the first housing 101 and an antenna pattern 143 provided in the antenna base 141.

The antenna base 141 mounted on the first housing 101 is bent after extending from the back face of the first housing 101. A portion of the antenna base 141 faces the back face of the first housing 101, and preferably extends in parallel with the back face of the first housing 101. The antenna base 141 is mounted on a circuit board (not shown) that is accommodated in the first housing 101, with a portion thereof being fixed to an outer side wall of a battery housing.

The first housing 101 includes the battery housing to have the battery pack 127 mounted on its back face. The battery housing includes a mounting recess 127a surrounded by a plurality of ribs 127b and 127c formed on the back face of the first housing 101, and the antenna base 141 is closely fixed to an outer side wall of one of the ribs 127b and 127c. In this way, the antenna base 141 can be firmly mounted on the first housing 101.

The antenna pattern 143 according to an exemplary embodiment of the present invention is located on a face of the antenna base 141. In an exemplary implementation, the antenna pattern is a radiation member made by cutting a conductive plate and then attaching it to the antenna base 141.

Although not shown in the drawing figures, the antenna pattern 143 may be formed as a printed circuit pattern formed on the surface of the antenna base 141. However, the antenna pattern 143 may be formed using any one of various alternative patterns selected by those of ordinary skill in the art taking into account manufacturing cost, yield, the target portable terminal 100, manufacturing conditions and the like.

The antenna pattern 143 may include a feeding pattern 143a, a ground pattern 143b, and a radiation pattern 143c. The feeding pattern 143a extends along a circumference of a side of the antenna base 141, and is connected with a feeding pin when the antenna base 141 is mounted on the circuit board of the portable terminal 100.

The ground pattern 143b extends from one end of the feeding pattern 143a and a portion thereof extends in parallel with the feeding pattern 143a. On the antenna base 141, a first region 147 is formed which is surrounded by the feeding pattern 143a and the ground pattern 143b. Once the antenna base 141 is mounted on the circuit board of the portable terminal 100, the ground pattern 143b is connected with a ground pin.

The radiation pattern 143c, as a part of the antenna device 104 is used for transmitting and receiving a high-frequency signal, extends from the one end of the feeding pattern 143a and a shape thereof may be set in a product design stage to guarantee sufficient radiation performance. On the antenna base 141, a second region 149 is formed in parallel with the first region 147, and a portion of a circumference of the second region 149 is surrounded by the ground pattern 143b and the radiation pattern 143c. In other words, the ground pattern 143b is positioned between the first region 147 and the second region 149.

The speaker module 106 is accommodated in the second housing 102. A top end portion of the second housing 102 is in the shape of a semi-cylindrical curve and the speaker module 106 is in the shape of the semi-cylindrical curve to correspond to the shape of the top end portion of the second housing 102.

The speaker module 106 includes a speaker housing 161 for accommodating at least one speaker unit. Since the speaker unit is accommodated in the speaker housing 161, it is not illustrated in the drawing figures.

As mentioned previously, the shape of the speaker module 106, more specifically, the shape of the speaker housing 161 corresponds to the shape of the top end portion of the second housing 102. A pair of support members 167, extending in parallel with each other, are formed at both side ends of the speaker housing 161. The support members 167 define a fixing position of the speaker housing 161 and allow the speaker housing 161 to be firmly mounted on the second housing 102.

At least one speaker unit, preferably a pair of speaker units are mounted in the speaker housing 161 in parallel with each other, and a flexible printed circuit 163 extending from the speaker units is drawn out from the speaker housing 161 via one of the support members 167. A speaker grille 165 may be attached onto a front face of the speaker housing 161.

To slidably couple the second housing 102 to the first housing 101, guide rods 153 and guide members 151 are mounted inside the second housing 102.

The guide rods 153 extend along the direction of sliding of the second housing 102 and are mounted in positions adjacent to both sides of the second housing 102. Both ends of each of the guide rods 153 are fixed to an inner face of the second housing 102 and a portion therebetween is maintained spaced apart from the inner face of the second housing 102.

The guide rods 153, together with the second housing 102, move on the first housing 101. When the speaker module 106 is opened, the antenna device 104 is positioned between the guide rods 153.

To fix the guide rods 153, support protrusions 155*b* and 155*c* are formed on the inner face of the second housing 102. The first support protrusion 155*c* has an engagement hole (not shown) on its side face, and one end of the guide rod 153 is engaged, by forced insertion, with the engagement hole. A separate engagement member 155*a* may be engaged with a top portion of the second support protrusion 155*b*. When one end of the guide rod 153 is engaged with the first support protrusion 155*c*, another end of the guide rod 153 is positioned on the top portion of the second support protrusion 155*b* and the engagement member 155*a* is mounted on the top portion of the second support protrusion 155*b* in order to fix the another end of the guide rod 153.

The guide members 151 surround the guide rods 153 in such a way as to slide on the second housing 102 by being guided by the guide rods 153, and are fixedly mounted on the first housing 101. In other words, the guide members 151 are fixedly mounted on the first housing 101 and the guide rods 153 are mounted passing through the guide members 151 to slide on the guide members 151. On the first housing 101, spaces used for fixing the guide members 151 are formed between ribs of the battery housing.

In other words, the second housing 102 is coupled to the first housing by means of the guide members 151 and the guide rods 153, and slides on the first housing 101 by being guided by the guide members 151 and the guide rods 153.

Figure 8:
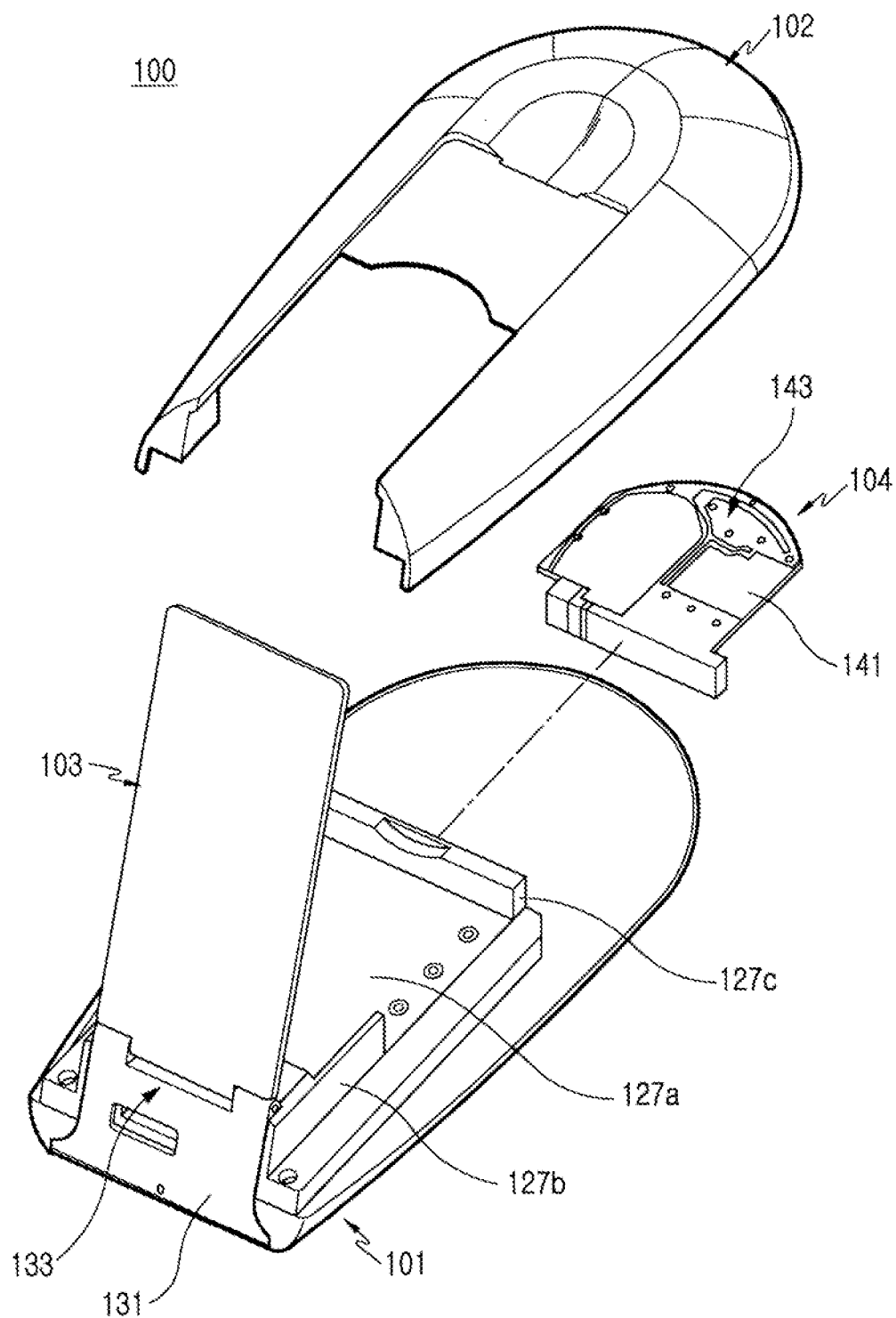
FIG. 8 is an exploded perspective view illustrating the portable terminal illustrated in FIG. 2, according to an exemplary embodiment of the present invention.

When the second housing 102 is coupled to the first housing 101, the antenna device 104 faces the inner face of the second housing 102. More specifically, the antenna pattern 143 faces the inner face of the second housing 102. Referring to FIG. 8, the antenna device 104 is positioned adjacent to a top end portion of the first housing 101, and the antenna device 104 overlaps with the speaker module 106 when the second housing 102 overlaps with the first housing 101. In this state, the speaker module 106 is interposed between the antenna device 104 and the back face of the first housing 101 and the antenna device 104 is accommodated in a space between the inner face of the second housing 102 and the speaker module 106.

When the antenna device 104 is positioned in the space between the inner face of the second housing 102 and the speaker module 106 by the overlapping between the first housing 101 and the second housing 102, the speaker units accommodated in the speaker module 106 are positioned to face the first region 147 and the second region 149 of the antenna base 141, respectively. In other words, one of the speaker units faces the first region 147 surrounded by the feeding pattern 143*a* and the ground pattern 143*b*, and the other faces the second region 149 partially surrounded by the ground pattern 143*b* and the radiation pattern 143*c*. The radiation pattern 143*c* is positioned above the speaker units while facing the speaker units. Thus, when the second housing 102 overlaps with the first housing 101, the radiation pattern 143*c* can perform sufficient transmission/reception without being subject to interference from the speaker units.

When the speaker module 106 is opened by sliding the second housing 102, the antenna device 104 leaves the space between the inner face of the second housing 102 and the speaker module 106 and the speaker units are positioned above the antenna device 104. Thus, even when the speaker module 106 is opened by sliding the second housing 102, the radiation pattern 143*c* can perform sufficient transmission/reception without being subject to interference from the speaker units.

As is apparent from the foregoing description, the portable terminal according to exemplary embodiments of the present invention has the first housing and the second housing slidably coupled to the first housing, in which the antenna device is mounted on the first housing, the speaker module is mounted on the second housing, and the antenna device is manufactured in the form of a plane, thereby contributing to a reduction in the thickness of the portable terminal.

Moreover, the antenna pattern of the antenna device, especially the radiation pattern in charge of transmission/reception of a high-frequency signal, is arranged in a position allowing minimization of interference from the speaker units, thereby allowing the antenna device to operate according to its unique characteristic and thus allowing larger-size speaker units to be mounted. Therefore, by means of the larger-size speaker units, the portable terminal can output rich sound with high quality.

In this way, by preventing interference between the speaker units and the antenna device, exemplary embodiments of the present invention can easily secure space used for arranging the speaker units and the antenna device in a limited space available in the portable terminal while improving the performance of the antenna device and the speaker module.

While the present invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A portable terminal, the terminal comprising:
    a first housing;
    a second housing coupled to the first housing for sliding relative to the first housing while adjacent to the first housing;
    an antenna device mounted to the first housing; and
    a speaker module comprising at least one speaker unit and being one of exposed and concealed by the first housing based on a sliding position of the second housing relative to the first housing, the speaker module being disposed in the second housing,
    wherein the antenna device is substantially disposed in a space between an inner face of the second housing and the speaker module, when the sliding position of the second housing relative to the first housing is such that the second housing overlaps with the first housing, and
    wherein the antenna device is not in the space between the inner face of the second housing and the speaker module when the speaker module is exposed by sliding the second housing.

2. The terminal of claim 1, wherein the antenna device comprises:
    an antenna base comprising a bend at a distance away from a back face of the first housing, a portion of the antenna base being positioned in parallel with the back face of the first housing; and
    an antenna pattern located on a surface of the antenna base.

3. The terminal of claim 2, wherein the antenna pattern comprises a radiation member including a cut conductive plate, and further wherein the conductive plate is attached to the antenna base.

4. The terminal of claim 2, wherein the antenna pattern comprises a printed circuit pattern formed on the surface of the antenna base.

5. The terminal of claim 1, wherein the speaker module comprises:
   a speaker housing disposed in the second housing; and
   a pair of speaker units mounted in parallel with each other in the speaker housing.

6. The terminal of claim 5, wherein the antenna device comprises:
   an antenna base comprising a bend at a distance away from a back face of the first housing, a portion of the antenna base being positioned in parallel with the back face of the first housing; and
   an antenna pattern formed on the surface of the antenna base.

7. The terminal of claim 6, wherein the antenna pattern comprises:
   a feeding pattern connected to a feeding unit of the portable terminal;
   a ground pattern connected to a ground unit of the portable terminal; and
   a radiation pattern connected to the feeding pattern and the ground pattern.

8. The terminal of claim 7, wherein when the antenna device is disposed in the space between the inner face of the second housing and the speaker module, a first speaker unit of the speaker units is positioned to face a first region of the antenna base, which is surrounded by the feeding pattern and the ground pattern, and a second speaker unit of the speaker units is positioned to face a second region of the antenna base, which is surrounded by the ground pattern and the radiation pattern.

9. The terminal of claim 8, wherein when the speaker module is exposed by sliding the second housing, the speaker units are moved to a position above the radiation pattern from a position which faces the antenna base.

10. The terminal of claim 5, wherein a top end portion of the second housing comprises a semi-cylindrical curve shape, and the speaker housing comprises the semi-cylindrical curve shape corresponding to the shape of the top end portion of the second housing, the speaker housing comprising a pair of support members extending from a bottom end in parallel with each other.

11. The terminal of claim 10, wherein the speaker module further comprises a flexible printed circuit extending from the speaker units, and at least a portion of the flexible printed circuit is adjacent to one of the support members.

12. The terminal of claim 5, further comprising a speaker grille attached onto a front face of the speaker housing.

13. The terminal of claim 1, further comprising a battery housing formed on the back face of the first housing, wherein the antenna device is closely and fixedly mounted to an outer side wall of the battery housing.

14. The terminal of claim 13, wherein at least one portion of a battery pack accommodated in the battery housing is exposed or concealed upon sliding the second housing relative to the first housing.

15. The terminal of claim 1, further comprising:
   a pair of spaced apart guide members mounted on the first housing; and
   a pair of guide rods disposed through the guide members on which the guide members slide,
   wherein both ends of each of the guide rods are fixed to the second housing, and the antenna device is positioned between the guide rods when the speaker module is exposed.

16. The terminal of claim 1, further comprising a support pivotably mounted to the first housing, wherein the support selectively covers a portion of the second housing when the speaker module is concealed.

17. A portable terminal, the terminal comprising:
   a first housing;
   an antenna comprising a substantially two-dimensional element fixedly mounted to the first housing;
   a second housing coupled to the first housing for sliding relative to the first housing while adjacent to the first housing; and
   a speaker module comprising at least one speaker unit and being one of exposed and concealed by the first housing based on the sliding position the second housing relative to the first housing, the speaker module being disposed in the second housing,
   wherein when the speaker module is concealed, a surface area of the antenna element substantially overlaps an area of the at least one speaker unit, and
   wherein when the speaker module is exposed by sliding the second housing, the at least one speaker unit is moved to not overlap the antenna element.

18. The terminal of claim 17, wherein the antenna element comprises:
   a first section, being positioned in parallel with a back face of the first housing, including an antenna pattern located therein; and
   a second section, continuous with the first section and extending in a direction substantially orthogonal to the first section.

19. The terminal of claim 18, further comprising a support pivotably mounted to the first housing, wherein the support selectively covers a portion of the second housing when the speaker module is concealed.

20. The terminal of claim 1, wherein the antenna device is configured to avoid electromagnetic interference from the at least one speaker unit when the antenna device is disposed in the space between the inner face of the second housing and the speaker module.

* * * * *